(12) United States Patent
Konieczny et al.

(10) Patent No.: US 11,572,234 B2
(45) Date of Patent: Feb. 7, 2023

(54) TEMPERATURE CONTROLLED CONVEYOR PULLEY

(71) Applicant: Punching Concepts, Inc., Alpena, MI (US)

(72) Inventors: Brian J. Konieczny, Posen, MI (US); Nicholas L. Kowalski, Posen, MI (US)

(73) Assignee: Punching Concepts, Inc., Alpena, MI (US)

( * ) Notice: Subject to any disclaimer, the term of this patent is extended or adjusted under 35 U.S.C. 154(b) by 460 days.

(21) Appl. No.: 16/817,670

(22) Filed: Mar. 13, 2020

(65) Prior Publication Data

US 2021/0284456 A1 Sep. 16, 2021

(51) Int. Cl.
| | |
|---|---|
| *B65G 23/04* | (2006.01) |
| *H05B 3/00* | (2006.01) |
| *B65G 45/00* | (2006.01) |
| *H01R 39/08* | (2006.01) |
| *H05B 3/82* | (2006.01) |
| *F16L 27/08* | (2006.01) |

(52) U.S. Cl.
CPC ............. *B65G 23/04* (2013.01); *B65G 45/00* (2013.01); *F16L 27/08* (2013.01); *H01R 39/08* (2013.01); *H05B 3/0095* (2013.01); *H05B 3/82* (2013.01)

(58) Field of Classification Search
CPC ........ B65G 23/04; B65G 23/08; B65G 23/22; B65G 23/23; B65G 45/00; B65G 45/105; B65G 45/22; B65G 2203/045; F16L 27/08; F16L 27/0804; F16L 27/0845; H01R 39/08; H01R 39/646; H05B 3/0095; H05B 3/04; H05B 3/82
See application file for complete search history.

(56) References Cited

U.S. PATENT DOCUMENTS

| | | |
|---|---|---|
| 1,532,774 A | 4/1925 | Page |
| 1,992,750 A | 2/1935 | Jensen |
| 2,384,281 A | 9/1945 | Carter |
| 2,462,006 A | 2/1949 | Schmitter et al. |

(Continued)

FOREIGN PATENT DOCUMENTS

KR  2014-0129476  * 11/2014

*Primary Examiner* — Hung D Nguyen

(74) *Attorney, Agent, or Firm* — Warner Norcross + Judd LLP

(57) ABSTRACT

An externally driven conveyor pulley with an integrated thermal control system by which the temperature of the pulley may be controlled whether the pulley is rotating or stationary. The present invention includes a rotary connection device (or plurality of such devices) designed to transfer fluid (liquid or gaseous) or electrical current into/out of a rotating object. The rotary connection device may be a slip-ring for electrical power transfer or a rotary union for liquid transfer, but any device designed to transmit fluid or electricity into a rotating object could be utilized. In one embodiment, temperature control is achieved by transmitting temperature controlled fluids through the pulley via at least one rotary connection device. In an alternative embodiment, temperature control is achieved by transmitting electricity via the rotary connection device to a temperature regulating device in the rotating object. The temperature regulating device could be any electrical heating or cooling unit.

20 Claims, 3 Drawing Sheets

(56) References Cited

U.S. PATENT DOCUMENTS

| | | | | |
|---|---|---|---|---|
| 2,473,251 | A | * | 6/1949 | Hsu .......................... H05B 6/54 |
| | | | | 28/179 |
| 2,684,319 | A | * | 7/1954 | Arnold ................. D06M 17/00 |
| | | | | 28/166 |
| 2,890,304 | A | | 6/1959 | Cole, Jr. |
| 3,464,680 | A | * | 9/1969 | Nakamura ........... H05B 3/0095 |
| | | | | 219/388 |
| 3,761,670 | A | * | 9/1973 | Slaats ...................... H05B 6/60 |
| | | | | 219/778 |
| 3,806,745 | A | | 4/1974 | Verhoeven et al. |
| 5,074,055 | A | * | 12/1991 | Peraniitty ............... F26B 13/18 |
| | | | | 34/110 |
| 2004/0118833 | A1 | * | 6/2004 | Rohrauer ............. B23Q 11/141 |
| | | | | 219/653 |
| 2006/0118392 | A1 | * | 6/2006 | El-Ibiary ................ B65G 23/08 |
| | | | | 198/781.03 |

* cited by examiner

TEMPERATURE CONTROLLED CONVEYOR PULLEY

BACKGROUND OF THE INVENTION

The present invention relates to belted conveyor systems, and more particularly to conveyor pulleys used in belted conveyor systems.

Belted conveyor systems are in widespread use throughout a diverse range of applications. A typical belted conveyor system includes a conveyor belt carrying products or materials that is driven, supported, and/or guided by a series of conveyor pulleys. These conveyor pulleys may be of the traditional round, drum style design with any or none of the various lagging materials typically applied to a pulley's surface, such as cold bonded rubber, weld on lagging, ceramic, vulcanized, etc. They may also be of any or none of the various beater-bar, finned, flighted, wing or enhanced wing style designs.

As noted above, belted conveyor systems are used in a variety of applications in both indoor and outdoor settings. Operating belted conveyor systems in colder climates has proven to present significant challenges. It is not uncommon for pulleys to ice up and for belts to become rigid during late fall, winter and early spring when belted conveyors are used outdoors in colder climates. For example, when belted conveyor systems are shut down for the evening, the cold may cause components of the system, such as the belt, to become rigid, snow may accumulate and ice may develop on the belts and pulleys.

In conventional systems, these concerns are addressed by using an external source of heat, such as a plurality of portable, stand-alone heaters that blow heat to melt ice and snow and to soften the belt before use. This approach is undesirable for a number of reasons. For example, stand-alone heaters are generally inefficient at delivering heat to the conveyor. Further, the stand-alone heaters require labor to position and operate. In some applications, a large number of external heaters are used and they must be separately managed to heat different portions of the system. In situations where there are not enough heaters to heat all of the desired locations at once, additional time and labor is required to heat the system in stages by repositioning the heaters.

There is a long-felt and unmet need for an improved system for controlling the temperature of belted conveyor systems, particularly in the context of outdoor systems operated in colder climates.

SUMMARY OF THE INVENTION

The present invention provides a thermal control system and method for controlling the temperature of a conveyor pulley internally by a device that is contained within or attached to the pulley itself. The invention gives the user the capability of regulating the temperature of the pulley while in either a stationary or a rotating state. This is accomplished via an attached apparatus that allows a fluid or electrical current to be transmitted to a rotating device. The most typical of such apparatus are commonly known as a slip ring for electrical power or a rotary union for fluid, but the invention may utilize any apparatus that functions in a similar manner to allow a stationary supply line (electrical power or fluid) to remain operatively connected to a rotating component.

In one embodiment, the conveyor pulley includes a shaft and a drum coaxially disposed over the shaft. In some embodiments, the temperature control system relies on the flow of externally heated fluid to heat the conveyor pulley. In such embodiments, a fluid inlet may be coupled to one end of the shaft by a slip ring, rotary union or other similar device. Similarly, a fluid outlet may be coupled to the opposite end of the shaft by a slip ring, rotary union or other similar device.

In one embodiment of a fluid-based system, the thermal control system may include a fluid supply conduit extending between the inlet end of the shaft and the drum, and a fluid discharge conduit extending between the outlet end of the shaft and the drum. For example, a fluid supply conduit may extend from the inlet end of the shaft to the adjacent end wall of the drum. Similarly, a fluid discharge conduit may extend from the outlet end of the shaft to the adjacent end wall of the drum.

In another embodiment, the thermal control system may include an electrically powered heater to heat the conveyor pulley, and the power supply wiring is coupled to one end of the conveyor pulley shaft by a slip ring. In this embodiment, the interior of the drum contains a fluid to distribute the heat uniformly about the conveyor pulley.

In one embodiment, the interior of the drum is divided into inner and outer regions. For example, the drum may include an internal circumferential wall that divides the interior of the drum into an inner cylindrical region surrounding the shaft and an outer ring-shaped region. In fluid-based systems, the thermal control fluid may be routed only through the outer region where it is in closer proximity to the outer wall of the drum where it may have improved heat transfer with the outer wall of the drum. In electrical-based systems, the heater and the heat distribution fluid are contained within the outer region. In use, the partitioned drum interior dramatically reduces the amount of fluid required by the thermal control system.

The present invention may be applied to a conveyor pulley with a shaft that is rigidly attached to the pulley, utilizing external bearings, or to a pulley with a stationary shaft, utilizing internal bearings to allow the pulley to rotate about the shaft.

The present invention will achieve temperature control either by way of the flow of a temperature controlled fluid through the pulley, or by way of a thermal device built in to the pulley that controls temperature by either induction or convection. The transfer of fluid or electricity to the pulley will be achieved by way of a slip ring, rotary union, or similar device allowing the flow of electricity or fluid into a rotating object.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

Figure 1:
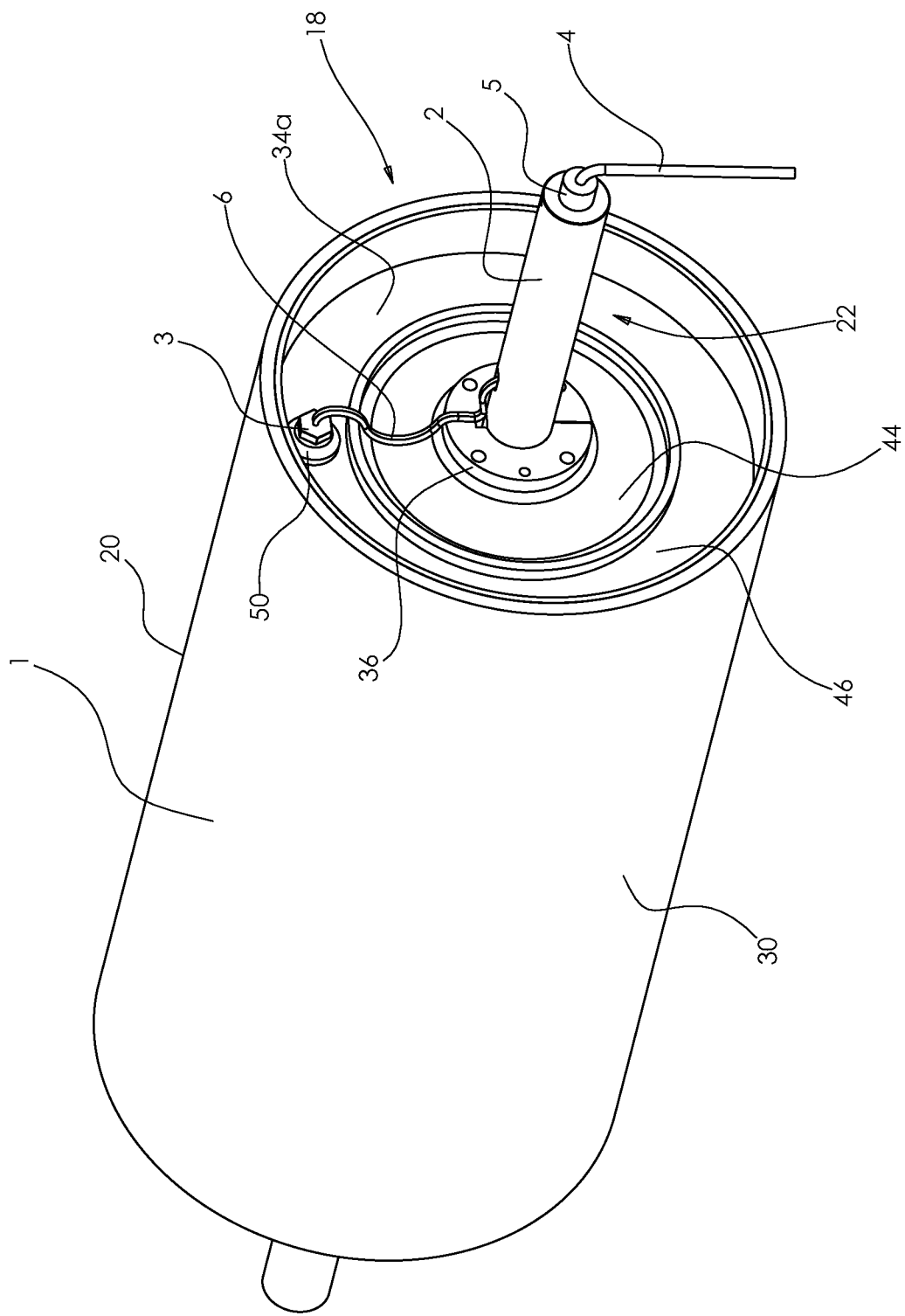
FIG. 1 is a conveyor pulley incorporating a thermal control system in accordance with an embodiment of the present invention.
Figure 2:
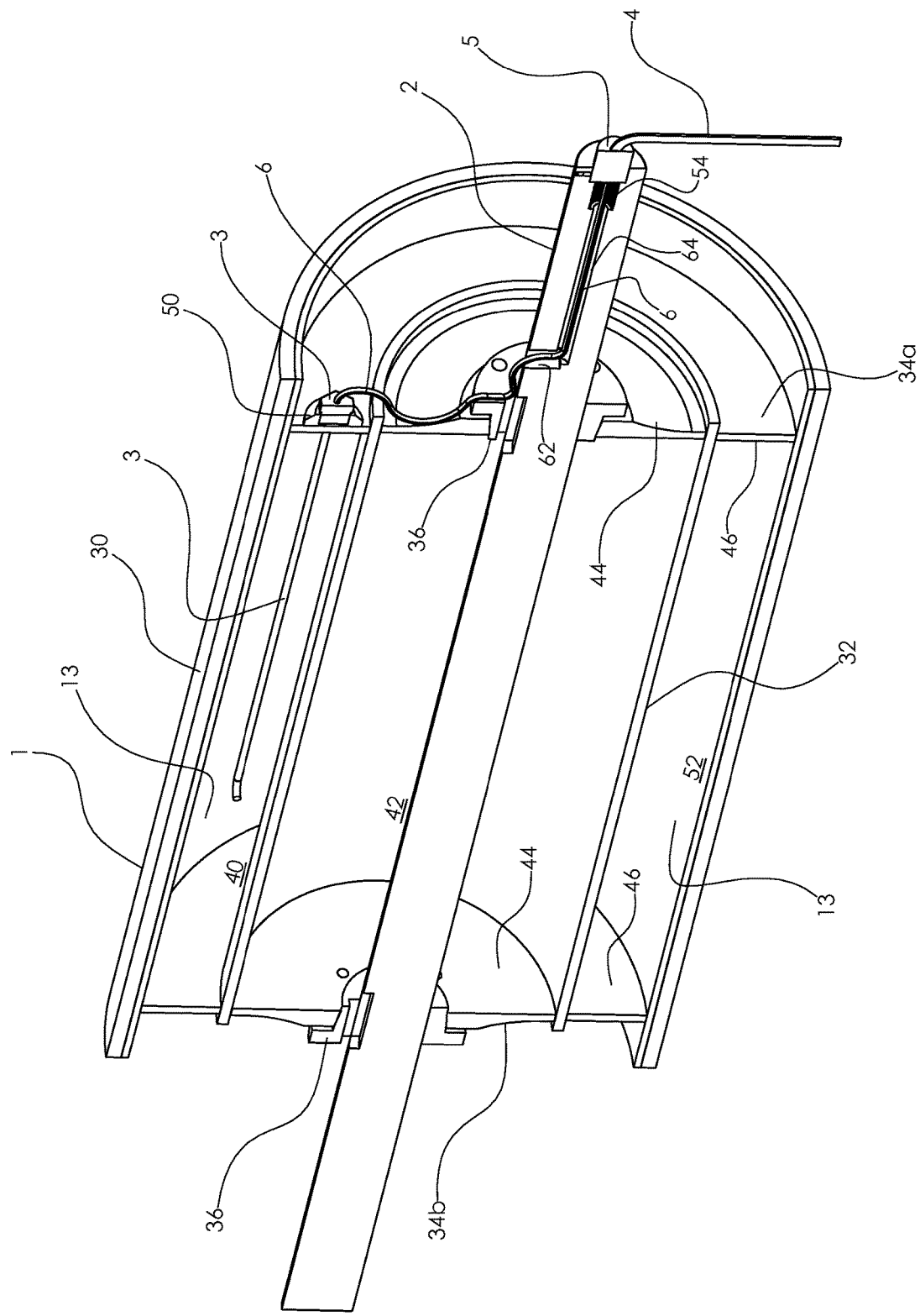
FIG. 2 is a sectional view of the conveyor pulley of FIG. 1.

A conveyor pulley 1 incorporating a thermal control system 18 in accordance with an embodiment of the present invention is shown in FIGS. 1 and 2. In this embodiment, the thermal control system 18 is electrically powered. The illustrated conveyor pulley 1 generally includes a shaft 2 and a drum 20 affixed to the shaft 2. The thermal control system 18 includes an electric heater 3 that is positioned inside the drum 20 of the conveyor pulley 1 and a power supply path 22 to deliver power to the electric heater 3. The power supply path 22 generally includes a slip ring 5 at which an external supply of electrical power is connected to the conveyor pulley 1, and a connecting wire 6 connecting the slip ring 5 to the electric heater. The slip ring 5 allows a stationary power supply cord 4 to be coupled to the rotating conveyor pulley 1.

The present invention is well suited for use in a wide range of conveyor pulleys. For purposes of disclosure, the present invention will be described in the content of the conveyor pulley shown in FIG. 1. The pulley could be utilized in any position (head/tail/snub/bend/idler/take-up) of a belt conveyor system where temperature control of the pulley is desired. The illustrated conveyor pulley 1 generally includes a shaft 2, a drum 20 disposed over the shaft 2, and attachments that affix the drum 20 to the shaft 2. In this embodiment, the shaft 2 is a length of round stock. One end of the shaft 2 is machined to seat the slip ring 5 and accommodate the connecting wire 6. For example, the shaft 2 may define a concentric internal bore 64 of sufficient diameter and length for the connecting wire 6, a cross bore 62 connecting with the internal bore 64 to allow the connecting wire 6 to emerge from the shaft 2, and a concentric threaded counter bore 54 configured to receive a threaded slip ring 5.

The design and configuration of the drum 20 may vary from application to application. The illustrated drum 20 generally includes an outer cylindrical wall 30, an inner cylindrical wall 32, and a pair of end walls 34a-b. The outer cylindrical wall 30 is configured to engage the conveyor belt (not shown) and may vary in length and diameter from application to application. The inner cylindrical wall 32 is disposed coaxially within the outer cylindrical wall 30 and is configured to partition the interior of the drum 20 into two separate compartments—an inner compartment 40 and an outer compartment 42. The diameter of the inner cylindrical wall 32 may be selected to control the relative volume of the two compartments 40 and 42. In the illustrated embodiment, the inner cylindrical wall 32 has a diameter of about 12" and the outer cylindrical wall has a diameter of about 18", whereby the volume of the outer compartment 40 is approximately one half of the total interior volume of the drum 20. The volume of the outer compartment 40 may vary, for example, between about 15% and 99% of the total interior volume of the drum 20, and in some exemplary embodiments will be no greater than about 25%, 35%, 50% or 75% of the total interior volume of the drum 20. The outer compartment 42 (or liquid compartment) in the illustrated embodiment is filled with a thermal distribution fluid 52. The thermal distribution fluid 52 may vary from application to application depending in large part on environmental temperatures, but in the illustrated embodiment is an environmentally safe coolant or antifreeze, such as propylene glycol.

The end walls 34 are fitted into opposite ends of the drum 20 to close off the interior of the drum 20. In this embodiment, each end wall 34 includes an assembly of a generally disk-shaped center portion 44 and a ring-shaped outer portion 46. The center portions 44 are fitted into the inner cylindrical wall 32 from opposite ends, and secured in place, for example, by welding. The outer portions 46 are fitted into the space between the inner cylindrical wall 32 and the outer cylindrical wall 30, and secured in place, for example, by welding. As can be seen, the center portions 44 close off the inner compartment 40 and the outer portions 46 close off the outer compartment 42. In this embodiment, each end wall 34 defines a central opening configured to receive a compression hub 36. The compression hubs 36 connect the drum 20 to the shaft 2 so that the drum 20 and shaft 2 are coupled and will rotate together. A wide range of suitable compression hubs are available on the market from various well-known suppliers. Although the illustrated embodiment includes compression hubs, the drum 20 may be connected to the shaft 2 by other types or forms of attachment. For example, the end walls 34 may be welded directly to the shaft 2. In the illustrated embodiment, the thermal control system 18 includes a single electrical heater 3 extending into the outer compartment 42 of the drum 20. To accommodate the heater 3, one of the end walls 34 defines a heater port 50 that provides an opening through which the heater 3 extends into the outer compartment 42. The heater port 50 also includes a connecting structure for attaching the heater 3 to the end wall 34 in a leak tight manner. For example, the heater port 50 may be internally threaded.

As noted above, the temperature control system 18 of FIGS. 1 and 3 generally includes an electric heater 3 and a power supply path 22. In this embodiment, the electric heater 3 is a resistive heater, such as a conventional engine block heater. However, the electric heater 3 can be essentially any suitable type of heater that can be mounted in the conveyor pulley 1 and be disposed within a fluid. In the illustrated embodiment, the thermal control system 18 includes a single heater 3, but the number of electric heaters may vary from application to application. For example, two heaters or more could be disposed in the drum 20 radially opposite one another. As noted above, the outer compartment 42 is filled with a thermal distribution fluid 52 that surrounds the heating element of the heater 3 and helps to distribute heat more uniformly over the drum 20. Although the illustrated embodiment includes an electric heater 3, the electrically powered device could alternatively be an electrically powered cooling device.

Referring to FIG. 1, the power supply path 22 of the illustrated embodiment generally includes a slip ring 5 at which an external supply of electrical power is connected to the conveyor pulley 1, and a connecting wire 6 connecting the slip ring 5 to the electric heater. The slip ring 5 allows a stationary power supply cord 4 to be coupled to the rotating conveyor pulley 1. One suitable slip ring 5 is sold by Mercotac under the brand name Mercotac. Although the illustrated embodiment includes a slip ring 5, the system may include essentially any rotary connection device that transmits electricity into a rotating object. For example, the apparatus may be a generally conventional slip ring 5 or any other device capable of maintaining electrical connection between the stationary (non-rotating) cord 4 and the rotating shaft 2. In the illustrated embodiment, the slip ring 5 is mounted into an axial end of the shaft 2. More specifically, in this embodiment, the slip ring 5 is seated in counter bore 54, for example, via threaded connection. As shown in FIG. 1, the electrical cord 4 is connected to a stationary portion of the slip ring 5. To deliver power from the slip ring 5 to the heater, an electrical cord 6 is attached to a rotating portion of the slip ring 5 and run through the shaft 2 along internal bore 64 and cross bore 62, and then into the heater 3, which is installed into the drum 20 of the conveyor pulley 1. In operation, the cord 4 attached to the outside of the slip ring 5 is allowed to remain stationary, while all other components 1, 2, 3, & 6 are rotating.

Figure 3:
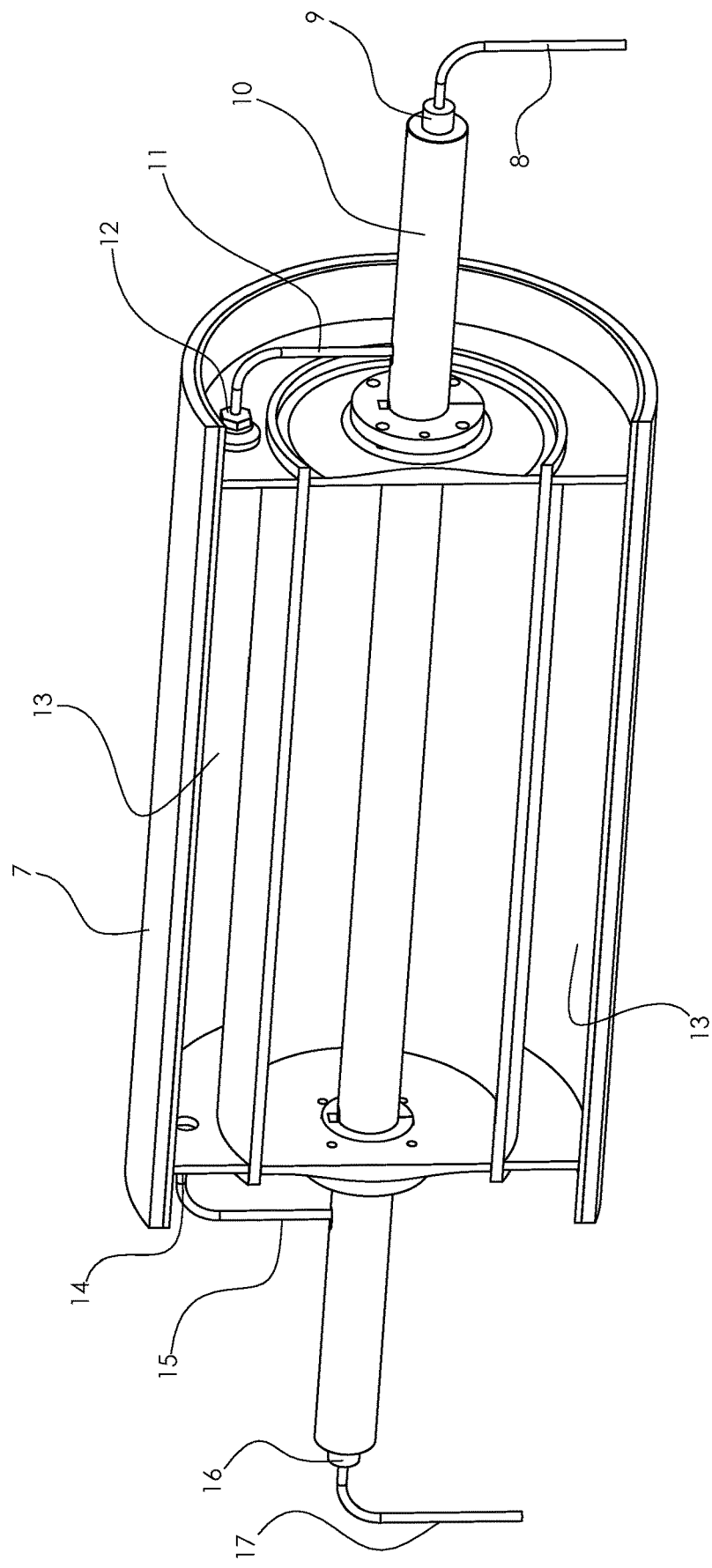
FIG. 3 is a sectional view of an alternative conveyor pulley in accordance with an alternative embodiment of the present invention.

In an alternative embodiment of the present invention, the thermal control system uses an external supply of fluid to control temperature. In cold weather climates, the fluid can be heated using essentially any external fluid heater. FIG. 3 shows a conveyor pulley 7 incorporating an implementation of a fluid-based thermal control system. The conveyor pulley 7 of FIG. 3 is essentially identical to the conveyor pulley 1, except as otherwise shown and described. One notable difference is that both ends of the shaft 10 define a counter bore, an internal bore and a cross bore (generally identical to counter bore 54, internal bore 64 and cross bore 62 of conveyor pulley 1). Referring to FIG. 3, a cutaway example conveyor pulley 7 with an attached shaft 10, whereby temperature controlled fluid is transmitted through the pulley 7 via a fluid transmitting device (may be a tube, hose, pipe, conduit, etc. but will heretofore be referred to as a tube) 8 attached to an inlet rotary union 9 or other rotary connection device that allows fluid to flow into or out of a rotating device. One suitable rotary union is sold by Rotary Systems under the brand name Rotary Systems. The inlet rotary union 9 is attached to the shaft 10 and allows the assembly to rotate while the incoming tube 8 remains stationary. A supply conduit 11, such as another tube or hose, is attached to the opposite side of the inlet rotary union 9 and travels through a hole in the shaft 10 and into an inlet port 12 allowing the fluid to flow into the interior of the drum. This illustration depicts a fluid chamber 13 to contain the fluid, but it could utilize coiled tube or any other means of transmitting fluid from one location to another. For example, a coiled tube may be disposed within the drum in direct contact with the internal surface of the outer cylindrical wall. The fluid is then able to exit the pulley 7 via an outlet port 14 through a return conduit 15, such as another tube or hose, travelling through another hole in the shaft 10, and exiting through the outlet rotary union 16 or other rotary connection device, which allows fluids to enter/exit a rotating object. Once the fluid exits the outlet rotary union 16, it flows into another conduit/tube 17 and then can be recirculated through an external temperature regulating device, and back to the original entry point 8. In some applications, the fluid may exit from the conveyor pulley to the environment rather than be recirculated and re-used.

The fluid used in a fluid-based system may vary from application to application depending in large part on environmental temperatures, but in the illustrated embodiment is an environmentally safe coolant or antifreeze, such as propylene glycol.

The fluid-based thermal control system of FIG. 3 may be coupled to essentially any system capable of supplying the desired temperature control fluid. For example, the thermal control system may be coupled to a circulating pump and reservoir combination that deliver fluid to the inlet rotary union 9 and return fluid from the outlet rotary union 16.

Although the rotary connection devices (e.g. slip ring 5 and rotary unions 9 and 16) discussed above are disposed on axial ends of the shaft 2 and 10, the slip ring 5, rotary union 9 or other similar device may be installed in other locations along the shaft, the compression hubs and potentially the end walls.

The present invention is described above in the context of a conveyor pulley with a rotating shaft. The present invention may be incorporated into conveyor pulleys in which the shaft is stationary. In such applications, the slip ring, rotary union or other similar rotary connection device may be coupled at or near the junction of the stationary shaft and the rotating drum.

In use, the thermal control system may be controlled manually or through automation, or a combination of both. For example, the thermal control system may be operated by a controller configured to intermittently engage the thermal control system based on the passage of time. As another example, the controller may be configured to operate based on feedback from temperature sensors, such as an environmental temperature sensor or temperature sensors incorporated into the conveyor system.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A conveyor pulley comprising:
a shaft;
a drum mounted to the shaft, the drum having an outer cylindrical wall configured to be in engagement with a conveyor belt, the drum defining an interior;
an electrical heater disposed at least partially within the drum interior; and
a power supply path delivering electrical power to the heater, the power supply path including a rotary connection device mounted to a rotating portion of the pulley, the rotary connection device having first and second electrical connectors capable of rotating with respect to one another, the rotary connection device maintaining electrical connections between the first and second electrical connectors even during relative motion, the first electrical connector configured to be electrically connected to and receive power from an external source of electrical power, the power supply path further including an electrical conductor extending from the second electrical connector to the heater.

2. The conveyor pulley of claim 1 wherein the rotary connection device is a slip ring.

3. The conveyor pulley of claim 2 wherein a fluid is disposed within the interior of the drum, the fluid being in contact with the heater.

4. The conveyor pulley of claim 3 wherein the interior of the drum is partitioned to define a fluid compartment.

5. The conveyor pulley of claim 4 wherein the drum includes an inner cylindrical wall cooperating with the outer cylindrical wall to partially define the fluid compartment.

6. The conveyor pulley of claim 5 wherein the rotary connection device is received in an end of the shaft.

7. The conveyor pulley of claim 6 wherein the drum includes an end wall; and
wherein the heater is mounted in the end wall.

8. The conveyor pulley of claim 7 wherein the shaft defines a passage through which the electrical conductor extends.

9. A conveyor pulley comprising:
a shaft;
a drum mounted to the shaft, the drum having an outer cylindrical wall configured to be in engagement with a conveyor belt, the drum defining an interior;
an inlet rotary connection device, the inlet rotary connection device configured to operatively connect with an external source of fluid;
a supply conduit coupling the inlet rotary connection device to the interior of the drum, whereby fluid arriving at the inlet rotary connection device under pressure flows through the supply conduit into the interior of the drum;
an outlet rotary connection device, the outlet rotary connection device configured to operatively connect with a fluid return line; and
a return conduit coupling the interior of the drum to the outlet rotary connection device, whereby fluid under pressure within the interior of the drum is capable of flowing out of the drum through the return conduit and the outlet rotary connection device.

10. The conveyor pulley of claim 9 wherein the interior of the drum is partitioned to define a fluid compartment of lesser volume than the interior of the drum.

11. The conveyor pulley of claim 10 wherein the drum includes an inner cylindrical wall cooperating with the outer cylindrical wall to partially define the fluid compartment.

12. The conveyor pulley of claim 11 wherein the inlet rotary connection device is received in a first end of the shaft.

13. The conveyor pulley of claim 12 wherein the outlet rotary connection device is received in a second end of the shaft opposite the first end.

14. The conveyor pulley of claim 13 wherein the shaft defines a first passage through which the supply conduit extends and a second passage through which the return conduit extends.

15. The conveyor pulley of claim 14 wherein the drum includes first and second end walls, the supply line being connected to the drum at an inlet in the first end wall, the return line being connected to the drum at an outlet in the second end wall.

16. The conveyor pulley of claim 15 wherein the fluid compartment has a volume no greater than about 50% of the volume of the interior of the drum.

17. A conveyor pulley comprising:
a shaft;
a drum mounted to the shaft, the drum having an outer cylindrical wall configured to be in engagement with a conveyor belt, an inner cylindrical wall disposed radially inward from the outer cylindrical wall and a pair of end walls that close opposite ends of the drum and are coupled to the shaft, the outer cylindrical wall, inner cylindrical wall and end walls cooperatively defining a fluid compartment;
a fluid contained within the fluid compartment and in direct contact with the inner surface of the outer cylindrical wall; and
a rotary connection device allowing at least one of electrical power and fluid to be introduced to the rotating conveyor pulley from an exterior stationary source.

18. The conveyor pulley of claim 17 wherein the rotary connection device is mounted within an end of the shaft.

19. The conveyor pulley of claim 18 further including an electrical heater mounted to an end wall and extending into the fluid compartment.

20. The conveyor pulley of claim 17 further including a fluid supply line extending from the rotary connection device to the drum, whereby fluid introduced at the rotary connection device flows into the fluid compartment.

* * * * *